(No Model.)
S. DARLING.
WINDOW GLASS.
No. 249,745. Patented Nov. 22, 1881.
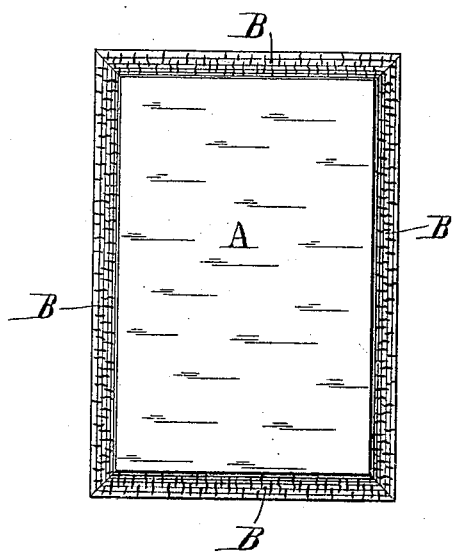
WITNESSES,
Geo. H. Remington
Charles Hannigan.
INVENTOR,
Samuel Darling

UNITED STATES PATENT OFFICE.

SAMUEL DARLING, OF PROVIDENCE, RHODE ISLAND.

WINDOW-GLASS.

SPECIFICATION forming part of Letters Patent No. 249,745, dated November 22, 1881.

Application filed September 14, 1881. (No model.)

To all whom it may concern:

Be it known that I, SAMUEL DARLING, of Providence, Rhode Island, have invented a certain new and useful Improvement in Window-Glass, of which the following is a specification, reference being had to the accompanying drawing, forming part thereof.

The object of my invention is to make a glass to which putty will adhere with greater tenacity than it does to common glass; and it consists in roughening the glass where the putty is to be laid, which may be done by a sand-blast, or other methods of doing such work.

It is obvious that nothing will stick to smooth glass as well as it will to glass that has been roughened by grinding or otherwise. Putty can be easily removed from smooth glass, but it adheres to roughened glass with its whole strength.

The accompanying drawing represents a light of glass having my improvement.

The letter A represents the smooth part of the glass, and B B B B the rough part where the putty is to be laid.

The importance of this invention, and especially in glass for glass roofs, is evident.

Having described my improvement, I claim—

As a new article of manufacture, window-glass having a roughened surface where the putty is to be laid and the other part smooth, substantially as described.

SAML. DARLING.

Witnesses:
JACOB KETTNER,
JOHN E. HALL.